US012630706B2

(12) United States Patent
Aurilia et al.

(10) Patent No.: US 12,630,706 B2
(45) Date of Patent: May 19, 2026

(54) MEMBRANE COMPRISING A BLEND OF POLYARYLETHERSULFONE AND POLYARYLETHERKETONE AND METHOD FOR MANUFACTURING THEREOF

(71) Applicant: SYENSOO SPECIALTY POLYMERS USA, LLC, Alpharetta, GA (US)

(72) Inventors: Dario Aurilia, Cerro Maggiore (IT); Emanuele Di Nicolo', Gorla Minore (IT); Kelly D. Branham, Woodstock, GA (US); Vida Komer, Venetia, PA (US)

(73) Assignee: Syensqo Specialty Polymers USA, LLC, Alpharetta, GA (US)

( * ) Notice: Subject to any disclaimer, the term of this patent is extended or adjusted under 35 U.S.C. 154(b) by 749 days.

(21) Appl. No.: 17/627,154

(22) PCT Filed: Jul. 28, 2020

(86) PCT No.: PCT/EP2020/071215

§ 371 (c)(1),
(2) Date: Jan. 14, 2022

(87) PCT Pub. No.: WO2021/018868

PCT Pub. Date: Feb. 4, 2021

(65) Prior Publication Data

US 2022/0267587 A1 Aug. 25, 2022

Related U.S. Application Data

(60) Provisional application No. 62/880,202, filed on Jul. 30, 2019.

(30) Foreign Application Priority Data

Sep. 18, 2019 (EP) .................................... 19197984

(51) Int. Cl.

| | |
|---|---|
| ***C08L 61/16*** | (2006.01) |
| ***B01D 61/14*** | (2006.01) |
| ***B01D 67/00*** | (2006.01) |
| ***B01D 71/52*** | (2006.01) |
| ***B01D 71/68*** | (2006.01) |

(52) U.S. Cl.

CPC ............ *C08L 61/16* (2013.01); *B01D 67/003* (2013.01); *B01D 71/5221* (2022.08); *B01D 71/5222* (2022.08); *B01D 71/68* (2013.01); *B01D 61/14* (2013.01); *B01D 67/002* (2013.01); *C08L 2205/025* (2013.01)

(58) Field of Classification Search

CPC ................................ C08L 81/06; C08L 61/16

See application file for complete search history.

(56) References Cited

U.S. PATENT DOCUMENTS

| | | | | |
|---|---|---|---|---|
| 3,956,020 | A | 5/1976 | Weininger et al. | |
| 4,755,540 | A | 7/1988 | Blakey | |
| 4,957,817 | A | 9/1990 | Chau et al. | |
| 5,200,078 | A | 4/1993 | Beck et al. | |
| 5,205,968 | A | 4/1993 | Damrow et al. | |
| 2003/0208014 | A1 | 11/2003 | Kerres et al. | |
| 2019/0136057 | A1 | 5/2019 | Jeol et al. | |
| 2019/0240616 | A1* | 8/2019 | Eliseev | B01D 71/262 |
| 2019/0241712 | A1 | 8/2019 | Roller et al. | |

FOREIGN PATENT DOCUMENTS

| | | | | |
|---|---|---|---|---|
| CN | 106496992 | A * | 3/2017 | C08L 69/00 |
| EP | 417908 | A2 | 3/1991 | |
| WO | 2018065526 | A1 | 4/2018 | |

OTHER PUBLICATIONS

Machine translation of CN-106496992-A (2017, 7 pages).*

Sonnenschein M.F., "Hollow Fiber Microfiltration Membranes from Poly(ether ether ketone) (PEEK)", J. Appl. Pol. Sci., 1999, vol. 72, pp. 175-181, XP002985272, DOI: 10.1002/(SICI)1097-4628(19990411)72:2<175::AID-APP3>3.0.CO;2-H—John Wiley & Sons, Inc.

Sonnenschein M.F., "Micro- and Ultrafiltration Film Membranes from Poly(ether ether ketone) (PEEK)", J. Appl. Pol. Sci., 1999, vol. 74, pp. 1146-1155—John Wiley & Sons, Inc.

Lim S.S. et al., "Sulfonated poly(ether ether ketone)/poly(ether sulfone) composite membranes as an alternative proton exchange membrane in microbial fuel cells", International Journal of Hydrogen Energy, 2012, vol. 37, pp. 11409-11424, XP028400367, DOI: 10.1016/j.ijhydene.2012.04.155—Elsevier Science Publishers B.V., Barking, GB.

Porter M.C., "Pore size determination", in Handbook of Industrial Membrane Technology, 1990, p. 70-78—Noyes Publications.

Smolders, K. et al., "Terminology for membrane distillation", Desalination, 1989, vol. 72, pp. 249-262, XP000177921, DOI: 10.1016/0011-9164(89)80010-4—Elsevier Science Publishers B.V., Amsterdam, NL.

* cited by examiner

*Primary Examiner* — Brieann R Johnston

(74) *Attorney, Agent, or Firm* — Osha Bergman Watanabe & Burton LLP

(57) ABSTRACT

The present invention relates to a composition for the manufacturing of a porous article, notably a membrane, which comprises a semi-crystalline polymer, an amorphous polymer and at least one water-soluble salt. The present invention also relates to a method for manufacturing said porous article and to its use for purifying fluid(s).

16 Claims, No Drawings

MEMBRANE COMPRISING A BLEND OF POLYARYLETHERSULFONE AND POLYARYLETHERKETONE AND METHOD FOR MANUFACTURING THEREOF

CROSS-REFERENCE TO RELATED PATENT APPLICATIONS

This application is a U.S. national stage entry under 35 U.S.C. § 371 of international patent application No. PCT/EP2020/071215 filed on Jul. 28, 2020, which claims priority to U.S. provisional patent application No. 62/880,202, filed on Jul. 30, 2019, and to European patent application No. 19/197,984.8, filed on Sep. 18, 2019 the whole content of each being explicitly incorporated herein by reference.

TECHNICAL FIELD

The present invention relates to a composition for the manufacturing of a porous article, notably a membrane, which comprises a semi-crystalline polymer, an amorphous polymer and at least one water-soluble salt. The present invention also relates to a method for manufacturing said porous article and to its use for purifying fluid(s).

BACKGROUND ART

Porous membranes are discrete, thin interface that moderate the permeation of chemical species in contact with them. The key property of porous membranes is their ability to control the permeation rate of chemical species through the membrane itself. This feature is exploited in many different applications like separation applications (water and gas) or drug delivery applications.

Aromatic polymers (such as polysulphones and polyethersulphone), partially fluorinated polymers (such as polyvinylidene fluoride) and polyamides are widely used in the preparation of microfiltration and ultrafiltration membranes due to their good mechanical strength and thermal stability.

Porous membranes made by processing poly(aryl ether ketone) (PAEK) polymers are known in the art, for example from U.S. Pat. Nos. 4,957,817 and 5,200,078 (both in the name of The Dow Chemical Company).

Porous membranes, both in the form of flat sheets and hollow fibers, have been also prepared starting from blends of PAEK polymers with one additional ingredient and optionally a solvent.

U.S. Pat. No. 5,205,968 (The Dow Chemical Company) discloses a process for preparing a microporous membrane from an unsulfonated poly(etheretherketone)-type polymer, which comprises the steps of (A) forming a mixture comprising an unsulfonated poly(etheretherketone)-type polymer, an amorphous polymer and a plasticizer, (B) heating the resulting mixture so that the mixture becomes a fluid, (C) extruding or casting the fluid mixture into a membrane, (D) quenching or coagulating the membrane and (E) leaching the membrane under conditions such that at least a portion of said plasticizer and/or of said amorphous polymer is removed from said membrane. As amorphous polymers, a long list is provided in the general description of this patent. Among the other, polysulfones (PS) and polyethersulfones are mentioned.

Ternary blends comprising PEEK polymer for the manufacture of membranes have been also described in literature. Sonnenschein M. F. in "Hollow Fiber Microfiltration Membranes from Poly(ether ether ketone) (PEEK)" (J. Appl. Pol. Sci., Vol. 72, 175-181, 1999) disclosed the preparation of hollow fibers membranes from composition comprising PEEK, polysulphone (PS) and a mixture of diphenylisophthalate (DPIP) and diphenylterephthalate (DPTP) 75/25 wt. %. Sonnenschein M. F. in "Micro- and Ultrafiltration Film Membranes from Poly(ether ether ketone) (PEEK)" (J. Appl. Pol. Sci., Vol. 74, 1146-1155, 1999) disclosed film membranes obtained by extruding polymer blends of PEEK, PS and a small molecule solvent mixture and then by removing the PS and solvent in a subsequent extraction step.

U.S. Pat. No. 4,755,540 (Raychem Limited) discloses porous membranes of aromatic polymer, which are prepared by solvent extraction of a polymer which is "partially incompatible" with the aromatic, from a blend of the two.

WO 2018/065526 (Solvay specialty Polymers USA, L.L.C.) discloses a polymer composition for the preparation of a microporous membrane or hollow fiber. The composition therein described comprises (I) a poly(ether ether ketone) (PEEK) polymer or a poly(phenylene sulfide) (PPS) polymer, and (II) at least 28 wt. % based on the total weight of said composition of an additive, which is a sulfonate salt or a carboxylate salt. Examples of the composition as provided in the experimental section comprise a binary blend of PEEK and sodium benzenesulfonate in a ratio 60/40, and PPS and sodium benzenesulfonate in a ratio 50/50.

US 2019/0136057 (Solvay specialty Polymers USA, L.L.C.) discloses a polymer composition including at least two different polymers independently selected from a poly (aryl ether ketone) (PAEK), a poly(aryl ether sulfone) (PAES), a polyarylene sulfide (PAS) and a polyetherimide (PEI), and about 0.05 to about 2 wt. % of at least one alkali metal carbonate.

Porous membranes and articles are also disclosed in U.S. Pat. No. 3,956,020 (General Electric Company), US 2003/0208014 (3M Innovative Properties Company) and by Swee Su Lim wt. al., in "Sulfonated poly(ether ether ketone)/poly (ether sulfone) composite membranes as an alternative proton exchange membrane in microbial fuel cells" (International Journal of Hydrogen Energy, 37 (2012) 11409-11424).

SUMMARY OF INVENTION

The Applicant perceived that the need still exists for porous membranes notably suitable for use in water filtration, which show at the same time outstanding mechanical properties, chemical and thermal resistance, in addition to water permeability, notably at pressure higher than 1 bar.

The Applicant faced the problem of providing porous membranes characterized by outstanding mechanical properties and high water permeability, which can be manufactured in the form of flat sheet, tubular and hollow fibers and which are further suitable for use in water filtration.

The Applicant surprisingly found that the above mentioned problem can be solved by manufacturing a membrane starting from a composition comprising a ternary blend (in other words, three ingredients) of at least one poly(aryl ether ketone) (PAEK) polymer, at least one poly(aryl ether sulfone) (PAES) polymer and at least one sulfonate or carboxylate salt with a metal selected from alkaline metal or alkaline-earth metals group.

Thus, in a first aspect, the present invention relates to a composition [composition (C)] comprising, preferably consisting of:

(a) at least one poly(aryl ether ketone) (PAEK) polymer, (b) at least one poly(aryl ether sulfone) (PAES) polymer, and (c) at least one compound [compound (S)] comprising a sulfonate or carboxylate salt of a metal selected from the group consisting of alkaline metals, alkaline-earth metals, aluminum, iron, zinc, nickel, copper, palladium and silver.

According to a preferred embodiment, said composition (C) comprises said at least one PAEK polymer in an amount from 25 wt. % to 65 wt. % based on the total weight of said composition (C).

According to a preferred embodiment, said composition (C) comprises said at least one PAES polymer in an amount from 10 wt. % to 45 wt. % based on the total weight of said composition (C).

According to a preferred embodiment, said composition (C) comprises said at least one compound (S) in an amount from 10 wt. % to 50 wt. % based on the total weight of said composition (C), more preferably from 10 wt. % to 45 wt. %, even more preferably from 15 wt. % to 40 wt. %.

The Applicant surprisingly found that composition (C) as defined above can be advantageously processed via a melt extrusion process.

Thus, in a second aspect, the present invention relates to a method [method ($M^Q$)] for the manufacture of a membrane [membrane (Q)] comprising at least one porous layer [layer $L_Q$)], said method comprising (I) providing a composition [composition (C)] as defined above;

(II) processing said composition (C) to provide pellets;

(III) melt extruding the pellets obtained in step (II), thus providing a precursor layer [layer ($L_P$)];

(IV-a) contacting said layer ($L_P$) as obtained in step (III) with at least one organic solvent, thus providing an intermediate porous layer [layer ($L_{-iQa}$)], or (IV-b1) contacting said layer ($L_P$) as obtained in step (III) with water, thus providing a first intermediate porous layer [layer ($L_{-iQb}$)] and (IV-b2) contacting said layer ($L_{-iQb}$) with at least one organic solvent, thus providing a second intermediate porous layer [layer ($L_{-iQb2}$)];

(V) contacting said layer ($L_{-iQa}$) as obtained in step (IV-a) or said layer ($L_{-iQb2}$) as obtained in step (IV-b2) with water, thus providing a porous layer [layer ($L_Q$)].

In a third aspect, the present invention relates to a membrane (Q) comprising at least one layer ($L_Q$). Advantageously, said at least one layer ($L_Q$) is obtained by the above method ($M^Q$).

The Applicant surprisingly found that membrane (Q) according to the present invention is characterized by outstanding mechanical properties.

The Applicant surprisingly found that membrane (Q) according to the present invention is characterized by high water permeability. Indeed, when used in high-pressure filtration methods (e.g., at pressures higher than 1 bar), the membranes of the present invention do not undergo to compaction and are capable of resisting to high pressure without showing compaction or significant flux decay.

DESCRIPTION OF EMBODIMENTS

For the purposes of the present description:

the use of parentheses before and after symbols or numbers identifying compounds, chemical formulae or parts of formulae has the mere purpose of better distinguishing those symbols or numbers from the rest of the text and hence said parentheses can also be omitted;

the term "membrane" is intended to indicate to a discrete, generally thin, interface that moderates the permeation of chemical species in contact with it, said membrane containing pores of finite dimensions;

when the membrane of the invention comprise the porous layer ($L_Q$) as the only layer, the term "membrane (Q)" is used to indicate said layer ($L_Q$) as the two coincide;

the term "gravimetric porosity" is intended to denote the fraction of voids over the total volume of the porous membrane;

the term "solvent" is used herein in its usual meaning, that is it indicates a substance capable of dissolving another substance (solute) to form an uniformly dispersed mixture at the molecular level. In the case of a polymeric solute, it is common practice to refer to a solution of the polymer in a solvent when the resulting mixture is transparent and no phase separation is visible in the system. Phase separation is taken to be the point, often referred to as "cloud point", at which the solution becomes turbid or cloudy due to the formation of polymer aggregates;

"melting temperature (Tm)" or "Tm" or "melting point" is intended to indicate the melting temperature measured by differential scanning calorimetry (DSC) according to ASTM D3418 at 20° C./min as described in details in the examples;

the term "halogen" includes fluorine, chlorine, bromine, and iodine, unless indicated otherwise;

the adjective "aromatic" denotes any mono- or polynuclear cyclic group (or moiety) having a number of π electrons equal to 4n+2, where n is 1 or any positive integer; an aromatic group (or moiety) can be an aryl and arylene group (or moiety).

Membranes containing pores homogeneously distributed throughout their thickness are generally known as symmetric (or isotropic) membranes; membranes containing pores which are heterogeneously distributed throughout their thickness are generally known as asymmetric (or anisotropic) membranes.

Membrane (Q) may be either a symmetric membrane or an asymmetric membrane.

The asymmetric membrane (Q) typically comprises an outer layer containing pores having an average pore diameter smaller than the average pore diameter of the pores in one or more inner layers. Each of said layer(s) can be layer ($L_Q$) as defined above.

Preferably, said membrane (Q) has an average pore diameter from 0.040 μm to 0.100 μm, a bubble point (i.e., largest pore) from 0.300 μm to 0.400 μm and a smallest pore from 0.020 μm to 0.220 μm, as measured by ASTM F316.

Suitable techniques for the determination of the average pore diameter in the porous membranes of the invention are described for instance in Handbook of Industrial Membrane Technology. Edited by PORTER, Mark C. Noyes Publications, 1990. p. 70-78. Pore size of the membrane may be estimated by several techniques including Scanning Electron Microscopy (SEM), and/or measurements of bubble point, gas flux, water flux, and molecular weight cut off.

The membrane (Q) typically has a gravimetric porosity comprised between 5% and 90% by volume, preferably between 10% and 85%, more preferably between 30% and 75%, based on the total volume of the membrane. Good results have been obtained for gravimetric porosity between 50% and 75% by volume.

Suitable techniques for the determination of the gravimetric porosity in membrane (Q) are described for instance by SMOLDERS, K., et al. Terminology for membrane distillation. *Desalination.* 1989, vol. 72, p. 249-262.

Membrane (Q) may be either a self-standing porous membrane comprising said layer ($L_Q$) as the only layer or a multi-layered membrane, preferably comprising said layer ($L_Q$) supported onto a substrate.

Said substrate layer may be partially or fully interpenetrated by said layer ($L_Q$).

Said substrate is preferably made of material(s) having a minimal influence on the selectivity of the porous membrane. The substrate layer preferably consists of non-woven materials, glass fibers and/or polymeric material such as for example polypropylene, polyethylene, polyethyleneterephthalate.

Depending on its final intended use, membrane (Q) can be flat, when flat membranes are required, or tubular in shape, when tubular or hollow fiber membranes are required.

Flat membranes are generally preferred when high fluxes are required whereas hollow fibers membranes are particularly advantageous in applications wherein compact modules having high surface areas are required.

When membrane (Q) is flat, its thickness is advantageously from about 10 to about 800 microns, more preferably from about 25 to about 600 microns.

When membrane (Q) is tubular, its outer diameter can be up to 15 mm. When membrane (Q) has an outer diameter comprised between 0.5 mm and 3 mm, it is referred to as hollow fibers membrane. When membrane (Q) has a diameter of less than 0.5 mm, it is referred to as capillary membranes.

As used herein, a poly(aryl ether ketone) (PAEK) denotes any polymer comprising more than 50 mol. % of recurring units ($R_{PAEK}$) comprising a Ar'—C(═O)—Ar* group, where Ar' and Ar*, equal to or different from each other, are aromatic groups.

The recurring units ($R_{PAEK}$) may be selected from the group consisting of units of formulae (J-A) to (J-D) below:

(J-A)

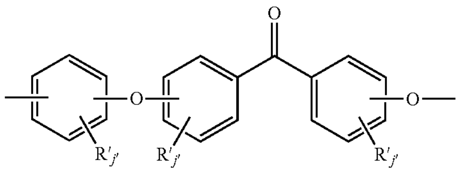

(J-B)

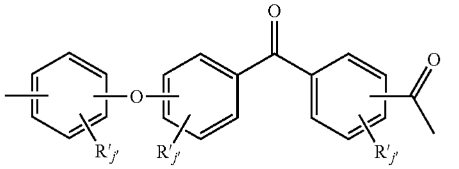

(J-C)

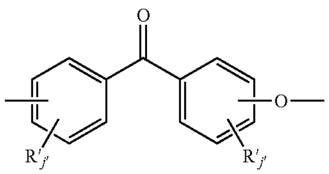

-continued (J-D)

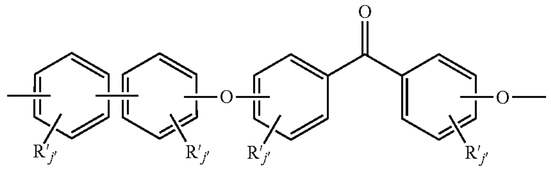

where each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j' is zero or an integer ranging from 1 to 4.

In recurring unit ($R_{PAEK}$), the respective phenylene moieties may independently have 1,2-, 1,4- or 1,3-linkages to the other moieties different from R' in the recurring unit ($R_{PAEK}$). Preferably, the phenylene moieties have 1,3- or 1,4-linkages, more preferably they have a 1,4-linkage.

In recurring units ($R_{PAEK}$), j' is preferably at each occurrence zero so that the phenylene moieties have no other substituents than those linking the main chain of the polymer.

Advantageously, said PAEK polymer is selected in the group comprising, preferably consisting of, poly(ether ether ketone) (PEEK), poly(ether ketone ketone) (PEKK), poly (ether ketone) (PEK) and copolymer of PEEK and poly (diphenyl ether ketone) (PEEK-PEDEK copolymer).

Preferably, said poly(ether ether ketone) (PEEK) denotes any polymer comprising more than 50 mol. % of recurring units ($R_{PAEK}$) of formula (J'-A)

(J'-A)

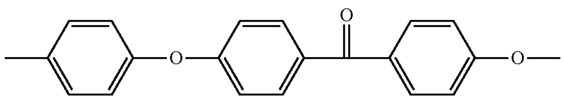

Preferably at least 60 mol. %, 70 mol. %, 80 mol. %, 90 mol. %, 95 mol. %, 99 mol. %, and most preferably all of recurring units ($R_{PAEK}$) are recurring units (J'-A).

Preferably, said poly(ether ketone ketone) (PEKK) denotes any polymer comprising more than 50 mol. % of recurring units ($R_{PAEK}$) of formula (J'-B) and formula (J''-B):

(J'-B)

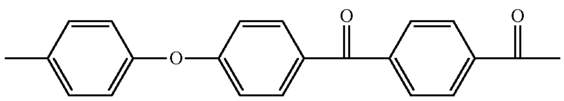

(J''-B)

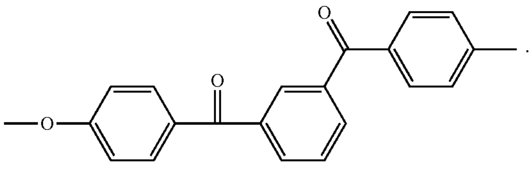

Preferably at least 60 mol. %, 70 mol. %, 80 mol. %, 90 mol. %, 95 mol. %, 99 mol. %, and most preferably all of recurring units ($R_{PAEK}$) are a combination of recurring units (J'-B) and (J"-B).

Preferably, said poly(ether ketone) (PEK) denotes any polymer comprising more than 50 mol. % of recurring units ($R_{PAEK}$) of formula (J'-C):

(J'-C)

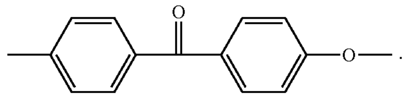

Preferably at least 60 mol. %, 70 mol. %, 80 mol. %, 90 mol. %, 95 mol. %, 99 mol. %, and most preferably all of recurring units ($R_{PAEK}$) are recurring units (J'-C).

Preferably, said PEEK-PEDEK copolymer denotes any polymer comprising more than 50 mol. % of recurring units ($R_{PAEK}$) of formula (J'-A) (PEEK recurring unit) and formula (J'-D) (poly(diphenyl ether ketone)(PEDEK) recurring unit):

(J'-D)

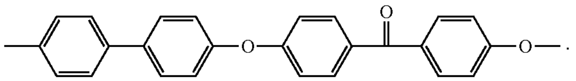

The PEEK-PEDEK copolymer may include relative molar proportions of recurring units (J'-A) and (J'-D) (PEEK/PEDEK) ranging from 95/5 to 60/40. Preferably the sum of recurring units (J'-A) and (J'-D) represents at least 60 mol. %, 70 mol. %, 80 mol. %, 90 mol. %, 95 mol. %, 99 mol. %, of recurring units in the PAEK. In some aspects, recurring units (J'-A) and (J'-D) represent all of the recurring units in the PAEK.

Most preferably, the PAEK is PEEK or PEEK-PEDEK.

Excellent results were obtained when the PAEK polymer used to prepare porous membrane was PEEK. KETASPIRE® PEEK is commercially available from Solvay Specialty Polymers USA, LLC.

For the purpose of the present invention, a poly(aryl ether sulfone) (PAES) denotes any polymer comprising at least 50 mol. % of recurring units ($R_{PAES}$) of formula (K):

(K)

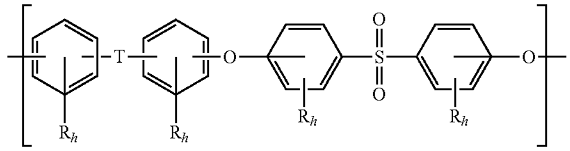

where each R, equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;

each h, equal to or different from each other, is an integer ranging from 0 to 4; and T is selected from the group consisting of a bond, a sulfone group [—S(=O)$_2$—], and a group —C($R_j$)($R_k$)—, where $R_j$ and $R_k$, equal to or different from each other, are selected from a hydrogen, a halogen, an alkyl, an alkenyl, an alkynyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium. $R_j$ and $R_k$ are preferably methyl groups.

Preferably at least 60 mol. %, 70 mol. %, 80 mol. %, 90 mol. %, 95 mol. %, 99 mol. %, and most preferably all of recurring units in the PAES are recurring units ($R_{PAES}$).

Advantageously, said PAES polymer is selected in the group comprising, preferably consisting of, polyphenylsulfone (PPSU), polyethersulfone (PES) and polysulfone (PSU).

Preferably, said polyphenylsulfone (PPSU) denotes any polymer comprising more than 50 mol. % of recurring units of formula (K'-A):

(K'-A)

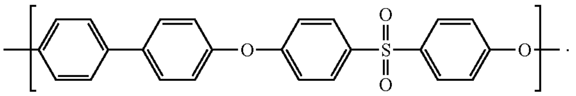

Preferably at least 60 mol. %, 70 mol. %, 80 mol. %, 90 mol. %, 95 mol. %, 99 mol. %, and most preferably all of the recurring units in the PPSU are recurring units of formula (K'-A).

PPSU can be prepared by known methods and is notably available as RADEL® PPSU from Solvay Specialty Polymers USA, L.L.C.

Preferably, said polyethersulfone (PES) denotes any polymer comprising at least 50 mol. % of recurring units of formula (K'-B):

(K'-B)

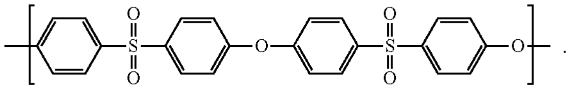

Preferably at least 60 mol. %, 70 mol. %, 80 mol. %, 90 mol. %, 95 mol. %, 99 mol. %, and most preferably all of the recurring units in the PES are recurring units of formula (K'-B).

PES can be prepared by known methods and is notably available as VERADEL® PESU from Solvay Specialty Polymers USA, L.L.C.

Preferably, said polysulfone (PSU) denotes any polymer comprising at least 50 mol. % of recurring units of formula (K'-C):

(K'-C)

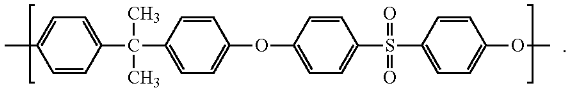

Preferably at least 60 mol. %, 70 mol. %, 80 mol. %, 90 mol. %, 95 mol. %, 99 mol. %, and most preferably all of the recurring units in the PSU are recurring units of formula (K'-C).

PSU can be prepared by known methods and is available as UDEL® PSU from Solvay Specialty Polymers USA, L.L.C.

Excellent results were obtained when said PEAS polymer used to prepare porous membrane was PSU.

Preferably, said compound (S) complies with following formula (I):

$$(R)_a\text{—Ar-}(T)_b \qquad (I)$$

wherein

Ar is an aromatic moiety selected from the group consisting of substituted or unsubstituted, aromatic monocyclic or polycyclic group having 5 to 18 carbon atoms,

- a is zero or an integer ranging from 1 to 5, preferably a is zero or 1; when a is an integer from 1 to 5, each of R, identical or different from each other, is selected from the group consisting of a halogen atom, —OH, —$NH_2$, a $C_1$-$C_{18}$ aliphatic group, a $C_1$-$C_{18}$ cycloaliphatic group and a $C_1$-$C_{18}$ aromatic group;
- b is an integer ranging from 1 to 4, preferably b is 1 or 2; each of T, identical or different from each other, is ($SO_3$—) $(M^{p+})_{1/p}$ or ($COO^-$) $(M^{p+})_{1/p}$ wherein $M^{p+}$ is a metal cation of p valence selected from the group consisting of alkaline metals, alkaline-earth metals, aluminium, iron, zinc, nickel, copper, palladium and silver.

As represented in above formula (I), compound (S) may comprise from 1 to 4 groups T, identical or different to each other, as defined above.

Preferably, each of R, identical or different from each other, is selected from the group consisting of halogen atom, —OH, —$NH_2$, and $C_1$-$C_3$ aliphatic group, such as methyl, ethyl or propyl.

Preferably, $M^{p+}$ is selected from alkali metals (column IA of the periodic table) or alkaline earths metal (column IIA of the periodic table).

In a preferred embodiment, $M^{p+}$ is sodium or potassium, such that T is a sodium and/or a potassium salt of sulfonic acid and/or carboxylic acid.

Preferably, said aromatic moiety in formula (I) is selected from the group consisting of:

(Ar-A)

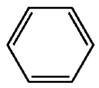

(Ar-B)

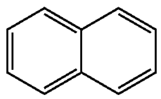

(Ar-C)

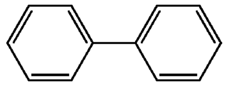

(Ar-D)

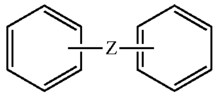

wherein

Z is a divalent moiety selected from the group consisting of —$SO_2$—, —CO— and alkylenes of 1 to 6 carbon atoms.

Preferably, Z is selected from —$C(CH_3)_2$— or —$C_nH_{2n}$— with n being an integer from 1 to 6, for example —$CH_2$— or —$CH_2$—$CH_2$—.

Preferably, aromatic moieties of formula (Ar-A) to (Ar-D) comprise 1, 2 or 3 groups T, identical or different from each other, where X is as defined above. More preferably, aromatic moieties of formula (Ar-A) to (Ar-D) comprise 1 or 2 groups T as defined above.

More preferably, said aromatic moiety in formula (I) complies with the following formula (Ar-A-II):

(Ar-A-II)

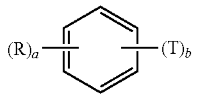

wherein:

a, R, b and T are as defined above.

Preferably, in above formulae (I) and (II), a is 0, 1 or 2.

According to one embodiment, a is zero so that the phenylene moieties have no other substituents than the sulfonate or carboxylate functions.

According to another embodiment, a is 1 and R is —$NH_2$.

Advantageously, compound (S) is by nature water-soluble.

As will be apparent to those skilled in the art, said compound (S) may also be said to be extractable, as defined below.

Preferably, compound (S) is selected in the group comprising, more preferably consisting of: benzoate, methyl benzoate, ethylbenzoate, propylbenzoate, benzene sulfonate, benzene disulfonate, p-toluene sulfonate, xylene sulfonate, cumene sulfonate, p-cymene sulfonate and dodecylbenzene sulfonate.

According to a preferred embodiment of the invention, compound (S) is selected from the group consisting of: sodium or potassium benzoate, sodium or potassium methyl benzoate, sodium or potassium ethylbenzoate, sodium or potassium butylbenzoate, sodium or potassium benzene sulfonate, sodium or potassium benzene-1,3-disulfonate, sodium or potassium p-toluene sulfonate, sodium or potassium xylenesulfonate, sodium or potassium cumene sulfonate, sodium or potassium para-cymene sulfonate, sodium or potassium n-butyl benzene sulfonate, sodium or potassium iso-butyl benzene sulfonate, sodium or potassium tert-butyl benezene sulfonate and sodium or potassium dodecylbenzenesulfonate.

According to another preferred embodiment, compound (S) further comprises at least one amino group. Under this embodiment, suitable example of compounds (S) is para-aminobenzoic acid salt with alkaline or alkaline-earth metal.

In a still preferred embodiment, said composition (C) comprises:

- said PAEK polymer in an amount from 30 to less than 55 wt. %, more preferably from 35 to less than 50 wt. %;
- said PAES polymer in an amount higher than 20 wt. % to 40 wt. %, more preferably from 25 wt. % to 35 wt. %; and
- said compound (S) in an amount from 10 to less than 45 wt. %, more preferably from 15 to 40 wt. %, the amounts being based on the total weight of said composition (C).

In a still preferred embodiment, said at least one PAEK polymer is PEEK polymer as defined above and said at least one PAES polymer is PSU polymer as defined above.

Optional ingredients can be added to composition (C) according to the present invention. Said optional ingredients can be selected from the person skilled in the art, based on the final use for which the membrane is intended.

When present, said optional ingredients are in a total amount of less than 10 wt. %, preferably less than 5 wt. % and even more preferably less than 3 wt. % based on the total weight of said composition (C).

Suitable optional ingredients are selected from: inorganic fillers, such as (nano)silica, $TiO_2$, ZnO, ZrO, sulfates, NaCl, carbonates; plasticizers comprising at least one solvent, which are selected from the group consisting of: diphenic acid, N,N-diphenylformamide, benzil, anthracene, i-phenylnaphthalene, 4-bromobiphenyl, 4-bromodiphenylether, benzophe-none, 1-benzyl-2-pyrrolidinone, o,o'-biphenol, phenanthrene, triphenyl-methanol, triphenylmethane, triphenylene, 1,2,3-triphenylbenzene, di-phenylsulfone, 2,5-diphenyloxazole, 2-biphenylcarboxylic acid, 4-biphenyl carboxylic acid, m-terphenyl, 4-benzoylbiphenyl, 2-benzoylnaphthalene, 3-phenoxybenzyl alcohol, fluoranthene, 2,5-diphenyl-1,3,4-oxadiazole, 9-fluorenone, 1,2, dibenzoylbenzene, dibenzoylmethane, p-terphenyl, 4-phenylphenol, 4,4'-bromobiphenyl, diphenylphthalate, 2,6-diphenylphenol, phenothiazine, 4,4'-dimethoxybenzophenone, 9,10-diphenylanthracene, pentachlorophenol, pyrene, 9,9'-bifluorene, mixture of terphenyls, mixture of partially hydrogenated terphenyls, mixture of terphenyls and quarter-phenyls, 1-phenyl-2-pyrrolidinone, 4,4'-isopropylidenediphenol, 4,4'-di hidroxybenzophenone, quaterphenyl, diphenyl terephthalate, 4,4'-dimethyl diphenylsulfone, 3,3',4,4'-tetramethyldiphenylsulfone, mixtures thereof.

In a preferred embodiment, the composition (C) used in the method (MO) of the present invention comprises only said PAEK polymer, said PAES polymer and said compound (S).

Composition (C) as defined above can be prepared by methods well known to the person of ordinary skill in the art.

For example, such methods include, but are not limited to, melt-mixing processes. Melt-mixing processes are typically carried out by heating a thermoplastic polymer above its melting temperature thereby forming a melt of the thermoplastic polymer Such a process may be carried out by heating the polymers above the melting temperature (Tm) of the PAEK polymer to form a melt of the polymers and/or above the glass transition temperature (Tg) of the PAES polymer.

In some embodiments, the processing temperature ranges from about 180-450° C., preferably from about 220-440° C., from about 260-430° C. or from about 280-420° C.

Preferably, the processing temperature is at least 15° C., preferably at least 30° C., at least 50° C., at least 80° C. or at least 100° C. greater than the melting temperature (Tg) of the PAEK polymer.

Preferably, the processing temperature is at least 15° C., preferably at least 30° C. or at least 50° C. greater than the glass transition temperature (Tg) of the PAES polymer.

When a blend of a PAEK polymer and a PAES polymer is provided, the melt-mixing process is carried out a temperature which the highest of the Tm or the Tg temperatures.

Step (I) and step (II) of the method (MO) of the present invention can be carried out as follows.

Step (I) can be carried out in a melt-mixing apparatus, for which any melt-mixing apparatus known to the one skilled in the art of preparing polymer compositions by melt mixing can be used. Suitable melt-mixing apparatus are, for example, kneaders, Banbury mixers, single-screw extruders, and twin-screw extruders. Preferably, use is made of an extruder fitted with means for dosing all the desired components to the extruder, either to the extruder's throat or to the melt. In the process for the preparation of the polymer composition the constituting components for forming the composition are fed to the melt-mixing apparatus and melt-mixed in that apparatus. The constituting components may be fed simultaneously as a powder mixture or granule mixer, also known as dry-blend, or may be fed separately.

Under step (II) of the process of the invention, composition (C) is advantageously provided in the form of pellets, which are then processed via the melt extrusion process under step (III).

The order of combining the polymers during melt-mixing is not particularly limited. In a preferred embodiment, a first step of melt-extruding said PAEK polymer and said compound (S) is performed thus obtaining a first composition in the form of pellets, followed by a second step of melt-extruding the pellets thus obtained with said PAES polymer, thus obtaining a second composition in the form of pellets. Said second composition is then used in step (III) of the process of the invention.

The method of manufacturing the polymer composition (C) may comprise if needed several successive steps of melt-mixing or extrusion under different conditions.

The process itself, or each step of the process if relevant, may also comprise a step consisting in a cooling of the molten mixture.

Under step (III), layer ($L_P$) is manufactured from the polymer composition (C) using melt extrusion process.

Preferably, said layer ($L_P$) is used as such in step (IV-a) or in step (IV-b1).

Under step (IV-a), extraction with at least one solvent (S) is performed to remove at least a portion of the PAES polymer from layer ($L_P$), so that layer ($L_{iQa}$) is obtained.

Said step (IV-a) is preferably performed by placing said at least one layer ($L_P$) in a first bath (also referred to as "leaching bath" or "bath for solvent extraction") comprising at least one solvent (S).

Suitable solvents (S) are selected from polar aprotic solvents, preferably selected in the group comprising, preferably consisting of: dimethylacetamide (DMAC), N-Methyl-2-Pyrrolidone (NMP), dimethyl sulfoxide (DMSO), dimethylformamide (DMF), methyl-5-(dimethylamino)-2-methyl-5-oxopentanoate that is commercially available from Solvay under the trademane Rhodiasolv® PolarClean, tetrahydrofuran (THF), dichloro-methane, sulfolane, dihydro-levoglucosenone commercially available under tradename Cyrene® from Circa Group; di-phenylsulfone, ε-Caprolactam.

Advantageously, said step (IV-a) is performed at a temperature from 5° C. to solvent's boiling point.

Preferably, the residence time in said bath is such that at least a portion of said PAES polymer is removed. The time period needed to dissolve at least a portion of the PAES polymer is variable. Preferably, the time period can vary between 30 minutes to 10 hours.

Under step (IV-b1) extraction with water is performed to remove at least a portion of compound (S) from said layer ($L_P$), so that layer ($L_Q$b) is obtained. Then, step (IV-b2) of extraction with at least one solvent (S) is performed to remove at least a portion of the PAES polymer from layer ($L_{iQb}$), so that layer ($L_{-iQ2}$) is obtained.

Said step (IV-b1) is performed by placing said at least one layer ($L_P$) in a water bath.

Said step (IV-b2) is performed by placing said at least one layer ($L_{iQb}$) in a second bath (also referred to as "leaching bath" or "bath for solvent extraction") comprising at least one solvent (S). Preferred solvents (S), temperature and time are as described above for step (IV-a).

Under step (V), extraction with water is performed, thus removing both solvent (S) as used in previous step and, optionally, at least a portion of the compound (S), so that layer ($L_Q$) is obtained.

Said step (V) is performed by placing said layer ($L_{-iQa}$) or said layer ($L_{-iQb2}$) in a water bath.

Optionally, a step of chemical treatment with an acid, more preferably with sulphuric acid ($H_2SO_4$), can be performed before or after each of steps (IV-a), (IV-b1), (IV-b2) and (V).

According to a preferred embodiment said step of chemical treatment is performed before said step (IV-a) or (IV-b1) or (V).

Optionally, one or more optional steps can be performed after step (V).

Preferably, said layer ($L_Q$) as obtained after step (V) can be contacted with at least one oxidant agent. Suitable oxidant agents are for example selected in the group comprising: potassium permanganate; ammonium persulfate; sodium hypochlorite; hydrogen peroxide; ozone; dichromate; and combinations thereof.

Preferably, an iron salt can be used together with said at least oxidant agent as catalyst.

For example, said layer ($L_Q$) as obtained after step (V) can be dried and/or stretched (this step may also be referred to as "drawn") and/or contacted with an alkaline, preferably in the form of liquid solution, such as for example 4-aminobutyric acid, 6-aminocaproic acid, 8-aminocaprylic acid, 3-amino-1-propanesulfonic acid.

According to one embodiment, before drying, solvent (S) remaining in the membrane can be exchanged with a more volatile, non-polar drying agent [solvent (D)], which possesses a lower surface tension compared to solvent (S).

Advantageously, said solvent (D) is a solvent for solvent (S) used in step (IV) and is a non-solvent for the PAEK polymer, such that the possibility of pore collapsing during drying is reduced. Preferably, solvent (D) is selected from isopropanol or isooctane.

The exchange from solvent (S) to solvent (D) may be carried out at temperatures which do not adversely affect the membrane, preferably between about 0° C. and about 100° C.

Drying can be performed by working under vacuum.

Membrane (Q) is preferably dried by properly selecting the temperature, such that the membrane (Q) is not negatively affected.

Advantageously, drying is performed at a temperature between 0° C. and 200° C., more preferably between 40° C. and 100° C.

At the end of step (V), a membrane (Q) is obtained comprising said layer ($L_Q$) as sole layer, said layer ($L_Q$) and a substrate as defined above.

Preferably, said membrane (Q) is stretched at a temperature that is above the glass transition temperature ($T_g$) of the PAEK polymer and below the crystalline melting point of the PAEK polymer.

According to another embodiment, a step of annealing said membrane (Q), or in other words exposing said membrane (Q) to high temperature, can be optionally performed after said step (Ill) and before said step (IV-a) or (IV-b1).

Preferably, said annealing step is performed at a temperature above the glass transition temperature ($T_g$) of said PAEK polymer and about 10° C. below the melting point of the PAEK polymer.

Preferably, said annealing step is performed for a time between about 30 seconds and about 24 hours.

Preferably, membrane (Q) according to the present invention is used for filtrating biologic solution (e.g. bioburden, virus, other large molecules) and/or buffer solutions (e.g. solutions that may contain small amount of solvents like DMSO or other polar aprotic solvents).

Preferably, membrane (Q) according to the present invention is used to filter oil/water emulsions, such as notably fracking water and the so-called "produced water", or in another words water coming from oil wells, water with high solid content, waste water.

Thus, in a further aspect, the present invention relates to the use of membrane (Q) as defined above, for filtering at least one fluid, said fluid being preferably selected from the group comprising, preferably consisting of: biologic solution, buffer solutions, oil/water emulsions, produced water.

According to another aspect, the present invention relates to a method for filtering at least one fluid, said method comprising contacting said fluid with at least one membrane (Q) as defined above.

Advantageously, said fluid is a liquid phase selected in the groups comprising, more preferably consisting of: biologic solutions (e.g. bioburden, virus, other large molecules); and/or buffer solutions (e.g. solutions that may contain small amount of solvents like DMSO or other polar aprotic solvents); and/or oil/water emulsions, such as notably fracking water and the so-called "produced water", or in another words water coming from oil wells, water with high solid content, waste water.

Further to the above, membrane (Q) according to present invention can also be employed in reverse osmosis, ultrafiltration and gas separation process as well as in gas transfer application from and into liquids.

Examples of gas separation applications include generation of nitrogen from air, hydrogen recovery in refinery and petrochemical plants, dehydration of gases and removal of acid gases from the natural gas.

Should the disclosure of any patents, patent applications, and publications which are incorporated herein by reference conflict with the description of the present application to the extent that it may render a term unclear, the present description shall take precedence.

The invention will be herein after illustrated in greater detail in the following section by means of non-limiting examples.

EXPERIMENTAL SECTION

Materials

The following were obtained from Solvay Specialty Polymers USA, LLC.:

Ketaspire® KT-820 NL PEEK polymer (MFR measured@400° C. and 2.16 Kg=3 g/10 min);

Udel® P1700 PSU polymer (MFR@343° C./2.16 Kg=6.5 g/10 min);

Udel® P3703 PSU polymer (MFR@343° C./2.16 Kg=17 g/10 min);

Dimethyl acetamide (DMAC) and isopropyl alcohol (IPA) were obtained from Sigma Aldrich®.

Micronized Sodium Benzoate was commercially available from Fluid Energy, Telford, PA.

Example 1

Pre-blends of the PEEK polymer and either sodium benzoate or sodium benzenesulfonate were obtained by blending these components in the ratio detailed in Table 1, using a ZSK-26 twin screw extruder (Coperion GmbH, Stuttgart, Germany), equipped with 12 barrel zones and a heated exit die operating at up to 450° C.

The barrel profile was as follows:

| Barrel# | 1 | 2 | 3 | 4 | 5 | 6 | 7 | 8 | 9 | 10 | 11 | 12 | Die |
|---|---|---|---|---|---|---|---|---|---|---|---|---|---|
| Set Point (° C.) | — | 330 | 330 | 360 | 360 | 360 | 360 | 360 | 340 | 340 | 340 | 340 | 360 |

TABLE 1

| Pre-blend | PEEK | PEEK % | Salt | Salt % |
|---|---|---|---|---|
| A | KT820P | 70 | Sodium Benzoate | 30 |
| B | KT820P | 65 | Sodium Benzoate | 35 |
| C | KT820P | 58 | Sodium Benzoate | 42 |
| D | KT820P | 55 | Sodium Benzoate | 45 |

A K-TronT-35 gravimetric feeder (from Coperion GmbH, Stuttgart, Germany) was used to feed each pre-blend into the feeding section(s) of the extruder to yield the proper mass ratio of the components. The components were melted and mixed with screws designed to achieve a homogeneous melt composition. The actual melt temperature at the exit die was measured with a hand-held device and found to be between 390-400° C.

The melt stream was air cooled and fed into a Maag Primo 60E pelletizer (from Maag Automatik GmbH, Stuttgart, Germany). Typical mass production rates were 10 to 20 kg per hour. Pellets from each pre-blend were collected and used to make the compound, with the compositions detailed in Table 2.

TABLE 2

| Example | Pre-blend | Pre-blend wt. % | PAES polymer | PAES polymer w. % |
|---|---|---|---|---|
| 2 | B | 70 | P1700 | 30 |
| 3 | C | 74 | P1700 | 26 |
| 4 | D | 70 | P1700 | 30 |
| 5 | B | 70 | P3703 | 30 |
| 6 | A | 70 | P3703 | 30 |

The pellets were collected and kept in sealed plastic buckets until used for melt film extrusion.

The pellets were dried overnight at 130° C. and subsequently fed to a single screw extruder and extruded into a film with a profile temperature of 360-390° C. using a film die. The film was taken up on a chilled godet roll operating with speed from 0.5 to 2 m/min and temperature from 90 to 170° C.

The precursor layer obtained in the above step was leached in DMAC overnight, decant and add clean DMAC with agitation for 2 hours, decant and add clean DMAC with agitation for 2 hours at room temperature, then transitioned to water with 3 water washes with agitation for 1 hour each.

The final compositions were manufactured as described in the following examples, following the method disclosed in Example 1.

Example 2

A compound of 45.5 wt. % KetaSpire® KT-820P, 30 wt. % Udel® P-1700, and 24.5 wt. % sodium benzoate was prepared by combining 70% of pre-blend B with 30% Udel® P1700.

Example 3

A compound of 40.7 wt. % KetaSpire® KT-820, 26 wt. % Udel® P-1700, and 33.3 wt. % sodium benzoate was prepared by combining 74% pre-blend D with 26% Udel® P1700.

Example 4

A compound of 40.6 wt. % KetaSpire® KT-820, 30 wt. % Udel® P-1700, and 29.4 wt. % sodium benzoate was prepared by combining 70% pre-blend C with 30% Udel® P1700.

Example 5

A compound of 45.5 wt. % KetaSpire® KT-820, wt. % Udel® P-3703, and 24.5 wt. % sodium benzoate was prepared by combining 70% pre-blend B with 30% Udel® P3703.

Example 6

A compound of 49 wt. % KetaSpire® KT-820, 30 wt. % Udel® P-3703, and 21 wt. % sodium benzoate was made by combining 70% pre-blend A with 30% Udel® P3703.

Example 7 (Comparison)

A compound of 55 wt. % KetaSpire® KT-820 and 45 wt. % Udel® P-3703, was prepared by blending the components in a Coperion ZSK-26 twin screw extruder (Coperion GmbH, Stuttgart, Germany). The components were melted and mixed with screws designed to achieve a homogeneous melt composition. The melt stream was cooled in a water bath and fed into a Maag Primo 60E pelletizer (Maag Automatik GmbH, Stuttgart, Germany). The pellets were collected and kept in sealed plastic buckets until used for melt film extrusion.

The pellets were then treated into a precursor layer, following the same procedure described above in Example 1. The precursor layer was then was leached in DMAC overnight, decant and add clean DMAC with agitation for 2 hours, decant and add clean DMAC with agitation for 2 hours at room temperature.

Methods

Water Flux Permeability

Water flux (J) through each membrane at given pressure, was defined as the volume which permeates per unit area and per unit time. The flux (J) expressed in L/(h×m$^2$), was calculated by the following equation:

$$J = \frac{V}{A\Delta t}$$

wherein

V (L) is the volume of permeate,

A (m$^2$) is the membrane area, and

Δt (h) is the operation time.

Water flux measurements were conducted at room temperature (23° C.) using dead-end configuration under a constant nitrogen pressure of 1 bar. Membrane discs with an effective area of 11.3 cm$^2$ were cut from the items stored in water and placed on a metal plate.

Gravimetric Porosity

Gravimetric porosity of the membrane was defined as the volume of the pores divided by the total volume of the membrane. Membrane porosity (ϵ) was determined according to the gravimetric method detailed below.

Perfectly dry membrane pieces were weighed and impregnated in isopropylic alcohol (IPA) for 24 h. After this time, the excess of the liquid was removed with tissue paper, and membranes weight was measured again. The porosities were measured using IPA (isopropyl alcohol) as wetting fluid according to the procedure described in Appendix of Desalination, 72 (1989) 249-262.

where $$\varepsilon = \frac{\frac{(\text{Wet}-\text{Dry})}{\rho_{liquid}}}{\frac{(\text{Wet}-\text{Dry})}{\rho_{liquid}} - \frac{\text{Dry}}{\rho_{polymer}}}$$

'Wet' was the weight of the wetted membrane,

'Dry' was the weight of dry membrane, $\rho_{polymer}$ was the density of Ketaspire® PEEK (1.30 g/cm$^3$) and $\rho_{liquid}$ was the density of IPA (0.78 g/cm$^3$).

Bubble Point and Pore Size Determination

Membranes bubble points (i.e, the measure of the largest pores), smallest pore size and average pore size were determined following ASTM F316 method, using a capillary flow porometer Porolux™ 1000 (Porometer-Belgium).

For each test, membrane samples were initially fully wetted using Fluorinert C 43 (fluorinated fluid with a surface tension of 16 dyn/cm). Nitrogen (inert gas) was used.

Thickness Measurement

Thickness values were measured on dry membranes using a Mitutoyo digimatic indicator (model ID-H0530). At least five measurements were performed and the average values were calculated and are reported in the Table below.

Tensile Measurements

Tensile measurements performed according to ASTM D638 type V; each sample was tested five times; values reported in the Table below comprise modulus, stress at break and strain at break.

Membrane Preparation

Membranes were manufactured using the compositions as detailed in Table 1; the compounding, film extrusion and film extraction procedures were performed as detailed in Example 1 above.

Membrane 4 was prepared by performing a step of annealing (thermal treatment at 250° C. for 1 hour) after the film extrusion and before film extraction.

TABLE 3

| Composition Example No. | Membrane No. | PEEK wt. % | PSU wt. % | Salt wt. % | Porosity (%) | Bubble point (nm) | Smallest pore (nm) | Average pore (nm) |
|---|---|---|---|---|---|---|---|---|
| 7(*) | 1C(*) | 55 | 45 | — | 69 | — | — | — |
| 2 | 2 | 45.5 | 30 | 24.5 | 63 | 386 | 48 | 51 |
| 2 | 3 | 45.5 | 30 | 24.5 | 61 | 365 | 49 | 52 |
| 2 | 4 | 45.5 | 30 | 24.5 | 57 | — | — | — |
| 5 | 5 | 49 | 30 | 21 | 59 | 382 | 38 | 44 |

(*)comparison

TABLE 4

| Membrane No. | MD Modulus (MPa) | MD Strain @break (%) | MD Stress @break (MPa) | TD Modulus (MPa) | TD Strain @break (%) | TD Stress @break (MPa) | Thickness (Micron) |
|---|---|---|---|---|---|---|---|
| 1C(*) | 322 | 31 | 15 | 52 | 8 | 1 | 340 |
| 2 | 567 | 79 | 22 | 216 | 31 | 10 | 322 |
| 3 | 517 | 81 | 23 | 288 | 44 | 14 | 437 |
| 4 | 916 | 37 | 33 | 315 | 19 | 12 | 194 |
| 5 | 604 | 80 | 25 | 302 | 42 | 13 | 392 |

(*)comparison
MD = machine direction
TD = transversal direction

Compaction Test

TABLE 5

| Membrane | $H_2O$ permeability (LHM-1 bar) | $H_2O$ permeability (LHM-2 bar) | $H_2O$ permeability (LHM-3 bar) |
|---|---|---|---|
| 1C(*) | 46 | 35 | 33 |
| 2 | 83 | 115 | 133 |
| 5 | — | 57 | 62 |

(*) comparison

The above results showed that the membrane prepared according to the invention retained a better flux at each pressure step and notably above 1 bar, and that, as pressure increased, a proportionality between flux and pressure was maintained. On the contrary, as pressure increased, the flux measured for the comparative membrane was strongly affected by pressure compaction.

The invention claimed is:

1. A thin film membrane [membrane (Q)], wherein the thin film membrane is formed from a composition [composition (C)], wherein the composition (C) comprises:

(a) at least one poly(aryl ether ketone) (PAEK) polymer wherein the at least one poly(aryl ether ketone) (PAEK) is a major component of the composition (C), (b) at least one poly(aryl ether sulfone) (PAES) polymer in an amount from 10 wt. % to 45 wt. %, and (c) at least one compound [compound(S)] comprising a sulfonate or carboxylate salt of a metal selected from the group consisting of alkaline metals, alkaline-earth metals, aluminum, iron, zinc, nickel, copper, palladium and silver, wherein the at least one compound(S) is in an amount from 10 wt. % to 50 wt. %, wherein the amounts are based on the total weight of said composition (C), wherein the thin film membrane [membrane (Q)] has a thickness of at least 190 μm and a bubble point from 0.300 μm to 0.400 μm and wherein the water permeability of the thin film membrane is maintained or increased as pressure is increased between 1-3 bar.

2. The thin film membrane according to claim 1, wherein said composition (C) comprises:

said PAEK polymer in an amount from 30 to less than 55 wt. %;

said PAES polymer in an amount higher than 20 wt. % to 40 wt. %; and said compound(S) in an amount from 10 to less than 45 wt. %, the amounts being based on the total weight of said composition (C).

3. The thin film membrane according to claim 1, wherein said PAEK polymer comprises more than 50 mol. % of recurring units ($R_{PAEK}$) comprising a Ar'—C(═O)—Ar* group, where Ar' and Ar*, equal to or different from each other, are aromatic groups, wherein said recurring units ($R_{PAEK}$) are selected from the group consisting of units of formulae (J-A) to (J-D) below:

(J-A)

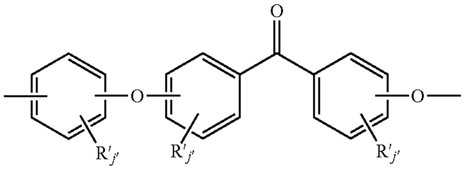

(J-B)

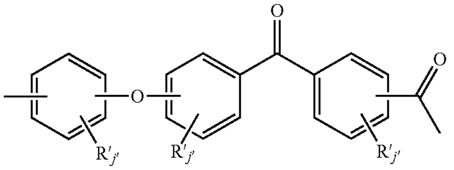

(J-C)

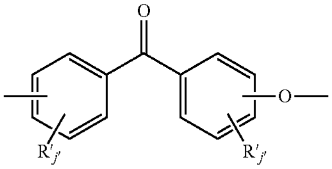

(J-D)

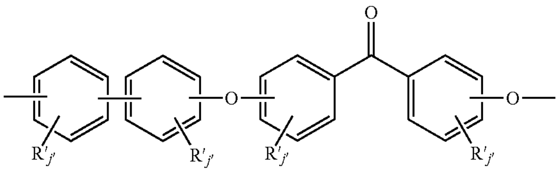

where each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j' is zero or an integer ranging from 1 to 4.

4. The thin film membrane according to claim 3, wherein said PAEK polymer is selected from the group consisting of:

poly(ether ether ketone) (PEEK) polymer comprising more than 50 mol. % of recurring units ($R_{PAEK}$) of formula (J'-A):

(J'-A)

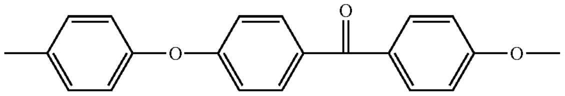

poly(ether ketone ketone) (PEKK) polymer comprising more than 50 mol. % of recurring units ($R_{PAEK}$) of formula (J'-B) and formula (J"-B):

(J'-B)

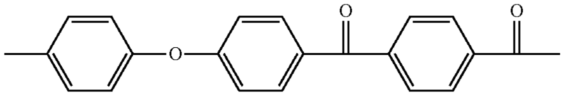

(J"-B)

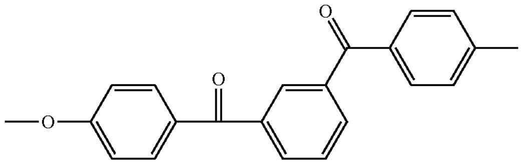

poly(ether ketone) (PEK) polymer comprising more than 50 mol. % of recurring units ($R_{PAEK}$) of formula (J'-C):

(J'-C)

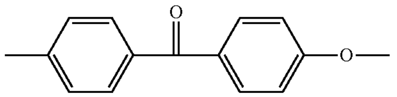

copolymer of PEEK and poly(diphenyl ether ketone) (PEEK-PEDEK copolymer) comprising more than 50 mol. % of recurring units ($R_{PAEK}$) of formula (J'-A) (PEEK recurring unit) and formula (J'-D) (poly(diphenyl ether ketone) (PEDEK) recurring unit):

(J'-D)

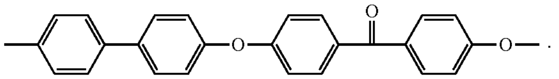

5. The thin film membrane according to claim 1, wherein said PAES polymer comprises at least 50 mol. % of recurring units ($R_{PAES}$) of formula (K):

(K)

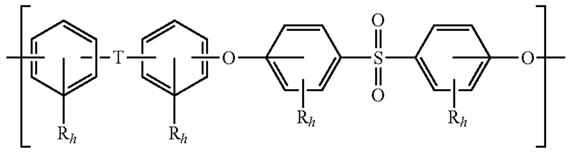

where each R, equal to or different from each other, is selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; each h, equal to or different from each other, is an integer ranging from 0 to 4; and T is selected from the group consisting of a bond, a sulfone group [$—S(═O)_2—$], and a group $—C(R_j)(R_k)—$, where $R_j$ and $R_k$, equal to or different from each other, are selected from a hydrogen, a halogen, an alkyl, an alkenyl, an alkynyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium.

6. The thin film membrane according to claim 5, wherein said PAES polymer is selected from the group consisting of:

polyphenylsulfone (PPSU) polymer comprising more than 50 mol. % of recurring units of formula (K'-A):

(K'-A)

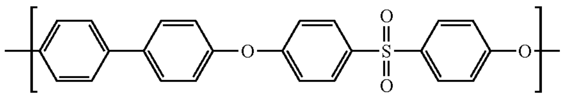

polyethersulfone (PES) polymer comprising at least 50 mol. % of recurring units of formula (K'-B):

(K'-B)

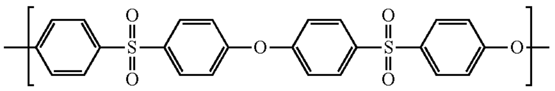

and polysulfone (PSU) polymer comprising at least 50 mol. % of recurring units of formula (K'-C):

(K'-C)

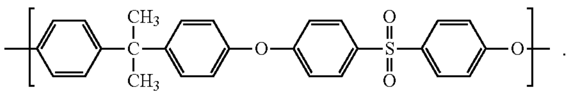

7. The thin film membrane according to claim 1, wherein said compound(S) complies with the following formula (I):

$(R)_a—Ar-(T)_b$ (I)

wherein

Ar is an aromatic moiety selected from the group consisting of substituted or unsubstituted, aromatic monocyclic or polycyclic group having 5 to 18 carbon atoms, a is zero or an integer ranging from 1 to 5;

when a is an integer from 1 to 5, each of R, identical or different from each other, is selected from the group consisting of a halogen atom, —OH, —$NH_2$, a $C_1$-$C_{18}$ aliphatic group, a $C_1$-$C_{18}$ cycloaliphatic group and a $C_1$-$C_{18}$ aromatic group;

b is an integer ranging from 1 to 4;

each of T, identical or different from each other, is $(SO_3^-)(M^{P+})_{1/p}$ or $(COO^-)$ $(M^{P+})_{1/p}$ wherein $M^{P+}$ is a metal cation of p valence selected in from the group consisting of the alkaline metals, alkaline-earth metals, aluminum, iron, zinc, nickel, copper, palladium and silver.

8. A method [method ($M^Q$)] for the manufacture of the thin film membrane [membrane (Q)] according to claim 1, the [membrane Q] comprising at least one porous layer [layer $L_Q$)], said method comprising (I) providing the composition [composition (C)];

(II) processing said composition (C) to provide pellets;

(III) melt extruding the pellets obtained in step (II), thus providing a precursor layer [layer ($L_P$)];

(IV-a) contacting said layer ($L_P$) as obtained in step (III) with at least one organic solvent, thus providing an intermediate porous layer [layer ($L_{-iQa}$)], or (IV-b1) contacting said layer ($L_P$) as obtained in step (III) with water, thus providing a first intermediate porous layer [layer ($L_{-iQb}$)];

(IV-b2) contacting said layer ($L_{-iQb}$) with at least one organic solvent, thus providing a second intermediate porous layer [layer ($L_{-iQb2}$)];

(V) contacting said layer ($L_{-iQa}$) as obtained in step (IV-a) or said layer ($L_{-iQb2}$) as obtained in step (IV-b2) with water, thus providing a porous layer [layer ($L_Q$)].

9. The method ($M^Q$) of claim 8, wherein said step (II) comprises:

a first step of melt-extruding said PAEK polymer and said compound(S) to provide a first composition in the form of pellets; and a second step of melt-extruding said pellets with said PAES polymer, to provide a second composition in the form of pellets.

10. The method ($M^Q$) of claim 8, wherein:

said step (IV-a) is performed by placing said at least one layer ($L_P$) in a first bath comprising at least one solvent [solvent(S)]; and/or said step (IV-b1) is performed by placing said at least one layer ($L_P$) in a water bath to provide said at least one layer ($L_{-iQb}$) and said step (IV-b2) is performed by placing said at least one layer ($L_{-iQb}$) in a second bath comprising at least one solvent [solvent(S)].

11. The method ($M^Q$) of claim 10, wherein said at least one solvent(S) is a polar aprotic solvent.

12. The method ($M^Q$) according to claim 8, wherein after said step (V), said layer ($L_Q$) is dried and/or stretched and/or contacted with an alkaline.

13. A thin film membrane [membrane (Q)] comprising at least one layer ($L_Q$) obtained by the method ($M^Q$) according to claim 8.

14. A method for filtering at least one fluid, said method comprising contacting said fluid with at least one membrane (Q) according to claim 13.

15. The thin film membrane according to claim 1, wherein said composition (C) comprises:

said PAEK polymer in an amount ranging from 45.5 to 55 wt. %;

said PAES polymer in an amount ranging from 30 to 45 wt. %; and said compound(S) in an amount ranging from 21 to 24.5 wt. %, the amounts being based on the total weight of said composition (C).

16. The thin film membrane according to claim 1, wherein the water permeability of the thin film membrane is increased as the pressure is increased in a range of 1-3 bar.

* * * * *